(12) United States Patent
Carstensen et al.

(10) Patent No.: US 9,670,836 B2
(45) Date of Patent: Jun. 6, 2017

(54) DRIVE UNIT FOR A MOTOR VEHICLE

(71) Applicant: VOLKSWAGEN AKTIENGESELLSCHAFT, Wolfsburg (DE)

(72) Inventors: Asmus Carstensen, Osloss (DE); Marcus Dallmann, Meine (DE); Jörg Fritzsche, Wolfsburg (DE); Andreas Herr, Wolfsburg (DE); Christoph Käppner, Braunschweig (DE); Thomas Schulenburg, Isenbuettel (DE); Artur Semke, Wolfsburg (DE); Jörg Volkmann, Bahrdorf (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 20 days.

(21) Appl. No.: 14/326,611

(22) Filed: Jul. 9, 2014

(65) Prior Publication Data
US 2015/0013328 A1  Jan. 15, 2015

(30) Foreign Application Priority Data

Jul. 9, 2013 (DE) ........................ 10 2013 011 477

(51) Int. Cl.
*F02B 47/08* (2006.01)
*F01K 23/06* (2006.01)
(Continued)

(52) U.S. Cl.
CPC ............ *F02B 47/08* (2013.01); *F01K 23/065* (2013.01); *F01N 5/02* (2013.01); *F02G 5/02* (2013.01);
(Continued)

(58) Field of Classification Search
CPC .. F01K 23/065; F01N 5/02; F01P 1/00; F02G 5/02
(Continued)

(56) References Cited

U.S. PATENT DOCUMENTS 6,142,221 A    11/2000  Johansson
8,091,360 B2*  1/2012   Hoetger ................ F01K 23/065
                                                    60/618

(Continued)

FOREIGN PATENT DOCUMENTS

CN    1194029 A     9/1998
CN    102086821 A   6/2011
(Continued)

OTHER PUBLICATIONS

Search Report for European Patent Application No. 14175147.9 (EP 2863022), dated Jul. 14, 2015.
(Continued)

*Primary Examiner* — Mark Laurenzi
*Assistant Examiner* — Dapinder Singh
(74) *Attorney, Agent, or Firm* — Pearl Cohen Zedek Latzer Baratz LLP

(57) ABSTRACT

A drive unit for a motor vehicle that has a combustion machine having an internal combustion engine (10) as well as an exhaust gas system via which exhaust gas can be discharged from the internal combustion engine (10), and has a cyclic device that can be used to convert the thermal energy contained in the exhaust gas into mechanical work in a clockwise thermodynamic cycle, whereby the cycle comprises a heat transfer from the exhaust gas to a working medium in a first heat exchange device, as a result of which the temperature and/or the pressure of the working medium is increased, comprises an expansion of the working medium in an expansion device (30) for generating the
(Continued)

mechanical work, and comprises a heat transfer from the working medium to a cooling medium in a second heat exchange device. The drive unit is refined in that the first heat exchange device comprises a first heat exchanger (20) and a second heat exchanger (26) as well as an intermediate circuit (22) containing a transfer medium, whereby in the first heat exchanger (20), thermal energy is transferred from the exhaust gas to the transfer medium, and in the second heat exchanger (26), thermal energy is transferred from the transfer medium to the working medium.

12 Claims, 5 Drawing Sheets

(51) Int. Cl.
  *F01N 5/02* (2006.01)
  *F02G 5/02* (2006.01)
(52) U.S. Cl.
  CPC .............. *Y02T 10/121* (2013.01); *Y02T 10/16* (2013.01); *Y02T 10/166* (2013.01)
(58) Field of Classification Search
  USPC ........................... 60/614–624, 655, 651, 671
  See application file for complete search history.

(56) References Cited

U.S. PATENT DOCUMENTS

| | | | | |
|---|---|---|---|---|
| 8,813,497 | B2 * | 8/2014 | Hart | G05D 7/0617 60/641.1 |
| 9,109,532 | B2 * | 8/2015 | Geskes | F01K 9/003 |
| 2006/0144585 | A1 * | 7/2006 | Ha | F01N 3/043 126/307 R |
| 2007/0007771 | A1 * | 1/2007 | Biddle | B01D 53/002 290/7 |
| 2009/0229786 | A1 * | 9/2009 | Freymann | F01K 3/18 165/42 |
| 2009/0277173 | A1 | 11/2009 | Ernst et al. | |
| 2010/0242476 | A1 * | 9/2010 | Ast | F01K 23/04 60/645 |
| 2011/0072816 | A1 | 3/2011 | Ernst et al. | |
| 2011/0094227 | A1 | 4/2011 | Ast et al. | |
| 2011/0131961 | A1 | 6/2011 | Lee et al. | |
| 2012/0111003 | A1 | 5/2012 | Kasuya et al. | |
| 2013/0146257 | A1 | 6/2013 | Kim et al. | |

FOREIGN PATENT DOCUMENTS

| | | |
|---|---|---|
| CN | 201909571 U | 7/2011 |
| CN | 103162473 A | 6/2013 |
| DE | 10 2007 033 611 A1 | 1/2009 |
| DE | 10 2008 013 650 A1 | 9/2009 |
| DE | 10 2009 028 467 A1 | 2/2011 |
| DE | 10 2009 035 522 A1 | 2/2011 |
| DE | 10 2010 033 659 A1 | 2/2012 |
| DE | 10 2010 042 401 A1 | 4/2012 |
| DE | 10 2011 076 054 A1 | 11/2012 |

OTHER PUBLICATIONS

German Search Report issued for German Patent Application No. DE 10 2013 011 477.2, mailed on Jan. 15, 2014.
Office Action for Chinese Patent Application No. 201410322033.8, issued Apr. 25, 2016.

* cited by examiner

DRIVE UNIT FOR A MOTOR VEHICLE

CROSS-REFERENCE TO RELATED APPLICATIONS

This application claims priority of German Patent Application DE 10 2013 011 477.2, filed Jul. 9, 2013, which is hereby incorporated by reference.

FIELD OF THE INVENTION

The invention relates to a drive unit for a motor vehicle.

BACKGROUND OF THE INVENTION

Nowadays, motor vehicles are usually powered by combustion machines in which fuel is burned and the thermal energy released in this process is partially converted into mechanical work. The efficiency of reciprocating combustion machines, which are almost exclusively the only means employed to power motor vehicles, amounts to only about one-third of the primary energy used. Consequently, two-thirds of the thermal energy released during the combustion is waste heat that is discharged to the environment as lost heat, either via the engine cooling system or via the exhaust gas system.

The utilization of this waste heat constitutes a way to increase the overall efficiency of the drive unit of the vehicle and consequently to lower the consumption of fuel.

German patent application DE 10 2008 028 467 A1 describes a device for the utilization of waste heat from an internal combustion engine. For this purpose, a first heat exchanger, namely, the evaporator, of a steam cyclic device is integrated into the exhaust gas system of the internal combustion engine. The thermal energy transferred in the heat exchanger from the exhaust gas to a working medium of the steam cyclic device is partially converted in an expansion device into mechanical energy that can be used, for instance, to assist the drive of a motor vehicle or to generate electrical energy. Downstream from the expansion device, the working medium is cooled in a second heat exchanger, namely, the condenser, a process in which it condenses. A feed pump increases the pressure of the working medium and feeds it to the evaporator.

The condenser is cooled by the coolant of a coolant circuit of the internal combustion engine. The return line of the coolant from the condenser can be switched by means of a three-way valve in such a way that the coolant is fed into the engine coolant circuit either upstream from the main cooler of the motor vehicle or upstream from the internal combustion engine. As a result, the waste heat that the coolant absorbs in the condenser can be used during a warm-up phase of the internal combustion engine in order to more quickly warm up the coolant. Here, in a generally known manner, it is provided for the engine cooler to be bypassed via a bypass line in order to avoid an undesired cooling of the coolant during the warm-up phase. By using the waste heat that has accumulated in the condenser, the internal combustion engine more quickly reaches its operating temperature, a process that is associated with a low fuel consumption and few emissions during the warm-up phase. After the operating temperature has been reached, the coolant that has been warmed up by the condenser can be fed directly into the engine coolant circuit upstream from the engine cooler. As a result, it can be prevented that waste heat from the condenser reduces the cooling capacity available for the internal combustion engine. On the other hand, however, it can also be provided that coolant exiting from the condenser is fed into the engine coolant circuit directly upstream from the internal combustion engine once the operating temperature has been reached. This can be provided if the engine outlet temperature of the coolant falls below a setpoint value, which can happen, for example, when the motor vehicle has been driven downhill for a prolonged period of time. Moreover, then the heating capacity of an interior heater that is based on the exchange of heat with the engine coolant circuit can be improved.

It is likewise a known procedure to integrate heat storage tanks, especially latent or chemical heat storage tanks, into the engine coolant circuit (see, for example, German patent application DE 10 2008 013 650 A1). During the operation of the internal combustion engine, once the operating temperature has been reached, these heat storage tanks absorb heat from the exhaust gas and temporarily store it. After a subsequent cold start of the combustion machine, the heat storage tanks once again release the stored heat to the engine coolant circuit, as a result of which the warm-up phase of the combustion machine is shortened.

It is also a known procedure to combine both of these measures in a combustion machine, whereby there is no interaction between the steam cycle and the heat storage tank. The heat storage tank here is a pure cold-start measure, whereas the steam cycle only becomes active once the operating temperature has been reached. A drawback of these systems is that the evaporator as well as the heat storage tank are both integrated into the exhaust gas system and they each have to have a bypass line in order to allow them to be bypassed so that, when they are not being used, an increase in the exhaust gas counter-pressure caused by the evaporator and the heat storage tank can be avoided.

An alternative combination of a heat storage tank with a steam cycle for the utilization of waste heat from the exhaust gas is known from German patent application DE 10 2007 033 611 A1. In this document, during the operating states of the internal combustion engine in which the thermal energy contained in the exhaust gas is greater than the maximum amount of thermal energy in the evaporator that can be transferred to the working medium, the use of appropriately configured bypass lines and valves is provided so as to divert part of the exhaust gas flow to the heat storage tank in order to "charge" it, insofar as it is not already completely "charged". On the other hand, during the operating states of the internal combustion engine in which the thermal energy of the exhaust gas is less than the thermal energy that can be converted in the evaporator, it is provided that the exhaust gas is first fed through the heat storage tank in order to warm up the exhaust gas, as a result of which the steam cycle can then be carried out more effectively. In order to prevent this from causing an impermissible cooling of the exhaust gas treatment devices of the exhaust gas system, the heat storage tank as well as the evaporator are integrated into the exhaust gas downstream from these exhaust gas treatment devices.

A combustion machine that is functionally similar and that has a steam cyclic device is known from German patent application DE 10 2009 035 522 A1. There, a steam reservoir is integrated into the steam cyclic device, so that the steam can be temporarily stored in this steam reservoir during times when it has been generated but cannot be utilized. The stored steam is fed back into the steam cycle again when more steam can be converted than can be generated through the utilization of exhaust gas heat.

Another alternative combination of a heat storage tank with a steam cycle for the utilization of waste heat from the exhaust gas is known from German patent application DE 10

2011 076 054 A1. For this purpose, it is provided for the heat storage tank to be integrated into the steam cycle and for it to be impinged with the working medium of the steam cycle. Here, it is provided that a supply line to the heat storage tank is integrated into the steam cycle between the evaporator and the expansion device, while a return line is integrated into the steam cycle between the expansion device and the condenser. Fundamentally, this means that the heat transferred from the heat storage tank to the working medium after a cold start of the combustion machine should be transferred in the evaporator to the exhaust gas, as a result of which the heating time for exhaust gas treatment devices arranged in the exhaust gas system downstream from the evaporator can be shortened. Moreover, German patent application DE 10 2011 076 054 A1 discloses that, as an alternative or in addition to warming up the exhaust gas during the warm-up phase, it can also be provided that the waste heat from the condenser shortens the warm-up phase of the combustion machine itself in that the condenser is cooled by the coolant of the engine coolant circuit. When the working medium is utilized in such a way, it can also be provided for the pressure of the working medium to be adjusted by means of a pressure adjuster so that the steam phase is temporarily eliminated and the working medium circulates in the liquid state throughout the entire circuit.

Before the backdrop of this state of the art, the invention was based on the objective of putting forward an improved integration of a steam cycle in a drive unit for a motor vehicle.

SUMMARY OF THE INVENTION

This objective is achieved by a drive unit. Advantageous embodiments of it can be gleaned from the description of the invention provided below.

The invention is based on the realization that, in a drive unit of the generic type that is known from German patent application DE 10 2007 033 611 A1 and that has a combustion machine having an internal combustion engine as well as an exhaust gas system via which exhaust gas can be discharged from the internal combustion engine, and has a cyclic device that can be used to convert thermal energy of the exhaust gas into mechanical work in a clockwise thermodynamic cycle, whereby the cycle comprises a (direct or indirect) heat transfer from the exhaust gas to a working medium in a first heat exchange device, as a result of which the temperature and/or the pressure of the working medium is increased, comprises an expansion of the working medium in an expansion device for generating the mechanical work, and comprises a (direct or indirect) heat transfer from the working medium to a cooling medium in a second heat exchange device, the heat transfer from the exhaust gas to the working medium can be associated with problems that can require a complicated structural configuration of the heat exchange device employed here. This is particularly the case when the first heat exchange device is integrated directly into the exhaust gas system, as a result of which the exhaust gas flows around the line(s) of this heat exchange device that carry the working medium. The lines and the working medium carried in them might then be exposed to local temperatures of several hundred degrees. This poses not only a considerable challenge to the structural design of the heat exchange device, but also to the working medium that is being used. For example, in drive units of the generic type, the clockwise cycle is normally configured as a steam cycle. The working media used for this purpose have to have evaporation and condensation temperatures that fall within relatively narrow limits. As a result, the organic working media that are frequently employed for this purpose have a relatively low degradation temperature that must not be exceeded during the cycle. In the case of ethanol, which is often used for such cycles, this temperature is, for instance, 361° C. [681.8° F.]. The useable range of media in the NOVEC group is even limited to below 300° C. [572° F.].

In order to prevent the working medium from reaching the degradation temperature, it is a known approach in the case of a drive unit of the generic type to use a bypass line so that the heat exchange device that is integrated into the exhaust gas system can be bypassed when the exhaust gas temperatures are too high. This configuration eliminates or diminishes the possibility to utilize the generated waste heat, which has a detrimental effect on the overall efficiency of the drive unit.

The invention is based on the idea of circumventing this problem in that a direct heat transfer from the exhaust gas to the working medium is avoided to such an extent that the degradation temperature of the working medium is not reached, even at the highest exhaust gas temperatures that occur. Rather, the heat transfer takes place indirectly via a transfer medium, especially a transfer fluid, especially preferably a transfer liquid, which thus serves as a "heat damper". The heat transfer can be controlled by means of the transfer medium (e.g. by changing the flow rate of the transfer medium) and consequently, any marked fluctuations that might occur in the heat supply in the exhaust gas can be "smoothed". Moreover, in this manner, it can be achieved that the heat transfer in the second heat exchanger, which preferably functions as an evaporator, can be operated at relatively constant inlet temperatures for the working medium and the transfer medium. This permits a good thermodynamic design of the evaporator since it is possible to relatively precisely locate the range of the so-called pinch point as well as the zone in which the phase of the working medium changes between the liquid and the gaseous phase.

This fundamental idea of the invention is implemented in a drive unit of the generic type in that a first heat exchange device with a transfer medium, especially a temperature-resistant heat-transfer oil, is used for the indirect heat transfer from the exhaust gas to the working medium.

Such a heat exchange device usually has at least a first heat exchanger and at least a second heat exchanger that are thermally connected via the transfer medium and especially via an intermediate circuit containing the transfer medium. Then, in the first heat exchanger, thermal energy is transferred from the exhaust gas to the transfer medium, while in the second heat exchanger, thermal energy is transferred from the transfer medium to the working medium. Here, the intermediate circuit can especially also have a compensation tank and/or a pump to circulate the transfer medium.

Another advantage of such an intermediate circuit can lie in the fact that the waste heat from the exhaust gas can be tapped at several places by means of several first heat exchangers. This can be done directly by arranging a heat exchanger in the exhaust gas flow, or else indirectly, for example, externally, on components that carry exhaust gas (for instance, an exhaust manifold, a cooler) of a (high-pressure and/or low-pressure) exhaust gas return line of the exhaust gas system (if applicable, also of the engine coolant circuit whose thermal energy also stems from the exhaust gas).

The involvement of the transfer medium here allows additional advantages to be achieved. In particular, the possibility exists to provide the transfer medium virtually free of (excess) pressure in the intermediate circuit, as a result of which it can be avoided that a heat exchanger that is directly exposed to high exhaust gas temperatures also has to be configured so as to be high-pressure resistant. In the case of drive units of the generic type, this is usually the case since the working medium is fed to the heat exchangers, which are configured as evaporators, at a pressure that is normally 25 bar to 30 bar. The highly complicated structure required for such heat-resistant and pressure-resistant heat exchangers can thus be avoided.

Preferably, it can be provided for the cycle to be a steam cycle, especially a Clausius-Rankine cycle, in which the pressure of the working medium in the liquid state is increased by means of a pump, then the working medium evaporates in the first heat exchange device and is preferably superheated and subsequently condenses in the second heat exchange device.

In another preferred embodiment of the drive unit according to the invention, it can be provided that a heat storage tank is integrated into the cyclic device that is provided in order to (directly or indirectly) absorb thermal energy from the exhaust gas and to transfer this thermal energy to the working medium.

Owing to this configuration of the drive unit, the thermal energy stored in the heat storage tank—for example, after a cold start of the combustion machine and/or during the operation of the combustion machine at a low load, which is normally associated with correspondingly low exhaust gas temperatures—can be transferred to the cycle, thereby assisting the cycle that otherwise could not (yet) be carried out due to insufficient heat absorption from the exhaust gas.

Particularly preferably, it can be provided for the heat storage tank to be integrated into the first heat exchange device and especially into the intermediate circuit. Then the heat transfer from the heat storage tank to the working medium can be employed to ensure evaporation of the working medium, even if the thermal energy transferred from the exhaust gas is not yet sufficient for this purpose. As a result, thermal energy can be converted into mechanical work in the expansion device. In order to achieve this, the heat storage tank can preferably be configured in such a way that the discharge temperature, that is to say, the temperature of the working medium that can be reached by the heat transfer from the heat storage tank under the otherwise prevailing conditions, is above the evaporation temperature of the working medium.

When the heat storage tank is integrated into the intermediate circuit, it is also preferable to provide an intermediate circuit bypass by means of which the heat storage tank can be bypassed whenever necessary.

A heat storage tank can also be integrated into the exhaust gas system without necessitating any heat coupling to the cyclic device. For example, after a cold start of the combustion machine or during the operation of the combustion machine at continuous low loads and correspondingly low exhaust gas temperatures, the heat storage tank can then be used to allow the operating temperature range to be quickly reached or maintained in an exhaust gas treatment device that is integrated into the exhaust gas system downstream from the heat storage tank.

In another preferred embodiment of the drive unit according to the invention, it can be provided that heat is transferred from the working medium to the cooling medium of a coolant circuit of the internal combustion engine. As a result, first of all, the waste heat from the clockwise cycle, which can account for the majority (for instance, approximately 85%) of the supplied thermal energy, can be discharged to the ambient air via a cooler, especially the main cooler of the motor vehicle. For this purpose, it can be provided that the thermal energy absorbed in the second heat exchange device can be transferred into the engine coolant circuit downstream from the internal combustion engine. For this purpose, at least one heat exchanger of the second heat exchange device can be integrated into the engine coolant circuit at this place. This prevents the thermal energy transferred from the cyclic device into the engine coolant circuit from having a detrimental effect on the cooling capacity available for the internal combustion engine. Secondly, owing to this configuration of the drive unit according to the invention, in certain operating states—for example, during a warm-up phase after a cold start of the combustion machine when the engine (especially the coolant of the engine coolant circuit or the motor oil) has not yet reached the intended operating temperature range—the waste heat from the cyclic device can be utilized in order to more quickly warm up the engine coolant circuit as well as, if applicable, other functional elements (e.g. interior heating systems, transmission oil, motor oil, etc.) that are connected to the engine coolant circuit in a heat-exchanging manner. Due to the quick warm-up of the working medium by means of the heat storage tank, the thermal energy released by the heat storage tank is also utilized accordingly.

In another preferred embodiment of the drive unit according to the invention, it can be provided that the cyclic device comprises a bypass line by means of which the expansion device can be bypassed. This can especially be advantageous if the discharge temperature of the heat storage tank is (at times) below the evaporation temperature of the working medium. Then, it might not be possible to implement the steam cycle, but the cyclic device can be used as a transfer circuit in order to transfer the thermal energy from the heat storage tank and/or from the exhaust gas to the coolant of the engine coolant circuit. The use of the bypass can also be beneficial if a conversion from thermal energy into mechanical energy by means of the cyclic device is not desired or necessary.

A structurally simple configuration of the drive unit according to the invention can be achieved if the first heat exchanger and the second heat exchanger are structurally and especially also spatially separated from each other, and if they are connected to each other via the intermediate circuit. This allows good flexibility in terms of integrating the cyclic device into a motor vehicle.

However, a heat exchange device with at least a first heat exchanger and a heat exchanger that is structurally separated from the first one can be disadvantageous in terms of the installation space required. In order to avoid this problem, it can be provided that the heat of the thermal energy stemming from the exhaust gas is first transferred to the transfer medium and from there to the working medium in a structural unit.

Accordingly, the first heat exchange device can comprise the three-medium heat exchanger that integrally forms the (or one of the) first heat exchanger(s) and the (or one of the) second heat exchanger(s), whereby the three-medium heat exchanger forms a first media channel for the exhaust gas, a second media channel for the working medium, and, in at least one section, a third media channel for the transfer medium and that is arranged between the first media channel and the second media channel, so that the heat transfer from the exhaust gas to the working medium takes place via the transfer medium.

A compact design and an especially good heat exchange can be achieved in that the three-medium heat exchanger is configured as a plate heat exchanger. Then, it can be provided that (at least) the second media channel and/or the third media channel is/are (each) formed in a plate, whereby the exhaust gas flows (at least partially) around the plate that forms the third media channel. Here, it can especially be provided that the second and/or the third media channel runs through the plate in question so as to be deflected several times (e.g. meander-like), in order to utilize the size of the plate for the heat exchange to the greatest extent possible.

In an especially preferred embodiment of the heat exchange device according to the invention, it can be provided that the third media channel for the transfer medium is arranged in only one section of the heat exchange device between the first and second media channels, whereas in another section, this is not the case, so that a heat transfer from the exhaust gas to the working medium takes place directly (that is to say, without involving the transfer medium). In an embodiment of the heat exchange device as a plate heat exchanger, this can preferably be achieved in that the plate that forms the third media channel is smaller than the plate that forms the second media channel, so that, in one section, the exhaust gas flows around the plate that forms the second media channel.

In this manner, it can be achieved that the exhaust gas and the working medium are only thermally separated by the transfer medium as long as the exhaust gas has or might have a very high temperature. However, as soon as an adequate cooling of the exhaust gas has been achieved, the overall heat transfer in the heat exchange device can be improved through the direct transfer of heat to the endothermic medium.

It can also preferably be provided that the three-medium heat exchanger is operated as a counter-flow heat exchanger. Accordingly, the flow direction of the exhaust gas in the first media channel would be opposite to the flow direction of the working medium in the second media channel.

Regarding the flow direction of the transfer medium in the third media channel, it can be advantageous if it is the same as the flow direction of the working medium in the second media channel.

In another preferred embodiment of the heat exchange device according to the invention, it can be provided that the second media channel widens in the flow direction of the working medium. As a result, an expansion of the working medium caused by the warming up process can be taken into account. In particular, this can allow the configuration of the three-medium heat exchanger as a three-medium evaporator that is characterized in that the working medium makes a phase transition from the liquid phase to the gaseous phase, along with an associated increase in the volume occupied by the working medium inside the three-medium evaporator.

The three-medium heat exchanger can especially preferably be configured as a multi-layered plate heat exchanger. For this purpose, a plurality of first, second and third media channels can be provided, whereby the second and third media channels are each formed in a plate, and whereby the plates that form the second media channels are each arranged between two plates that each form a third media channel, and whereby a plate that forms a first media channel is arranged between two plates that each form a third media channel.

Another advantage of the intermediate circuit according to the invention is that it permits a problem-free integration of a plurality of first heat exchangers into the first heat exchange device. Thus, in addition to a direct utilization of the thermal energy of the exhaust gas based on the arrangement of a first heat exchanger in the exhaust gas flow, there can also (alternatively or additionally) be an indirect utilization of the thermal energy in the exhaust gas. For this purpose, one or more (additional) first heat exchangers can be provided on components (e.g. exhaust gas manifold, cooler of an exhaust gas return line, cooler of an exhaust gas turbocharger) of the exhaust gas system (if applicable also of the engine coolant circuit). Via the intermediate circuit, the thermal energy absorbed in the various first heat exchangers of the first heat exchange device can be collectively fed to a single second heat exchange device (evaporator) of the cyclic device.

In order to prevent the heat extraction from the exhaust gas by the cyclic device from hindering a fast warm-up or the correct operation of an exhaust gas treatment device (e.g. catalyst(s) and/or particle filters), it can preferably be provided for a heat exchanger (arranged directly in the exhaust gas flow) of the first heat exchange device to be integrated into the exhaust gas system downstream from the exhaust gas treatment device.

In order to avoid an over-dimensioning of the cyclic device and thus a regularly poor efficiency during partial load operation, it can preferably be provided that the maximum capacity of the cyclic device during a clockwise cycle is configured as a function of the exhaust gas heat flow during operation of the internal combustion engine under partial load. Since the internal combustion engines of modern vehicles are operated under partial load most of the time, a good efficiency can then be achieved for the cyclic device. However, if the internal combustion engine is operated at times at or near full load, then the additional thermal energy of the exhaust gas that cannot be transferred by the cyclic device can be stored in the (preferably provided) intermediate storage tank in order to charge it (again).

The heat storage tank can preferably be a latent heat storage tank or a thermo-chemical heat storage tank. Latent heat storage tanks are devices that can store thermal energy over many repetition cycles and over a long period of time. For this purpose, so-called phase change materials (PCM) are used whose latent heat of fusion, heat of solution or absorption heat is far greater than the heat that they can store on the basis of their normal specific heating capacity (without the phase change effect). In contrast, thermo-chemical heat storage tanks use the enthalpy of reversible chemical reactions, for example, of absorption and desorption processes based on chemisorption.

In another preferred embodiment of the drive unit according to the invention, it can be provided that there is a device for predicting a future trip profile that is to be driven (especially immediately subsequently or as the next one) in the vehicle equipped with the drive unit, whereby the heat transfer to the cyclic device and/or to the (preferably provided) heat storage tank is controlled as a function of the predicted trip profile and/or else the heat release from the heat storage tank is controlled as a function of the predicted trip profile.

Preferably, it can be provided that the prediction device comprises a navigation system. A navigation system especially comprises a satellite-assisted positioning device as well as geographic map data that can be evaluated. Such map data can encompass not only information about the layout of routes (streets, roads, etc.) but especially also information about the type of route sections (highway, country road, city street, etc.) as well as the speed limits that apply there. Topographical data can also be provided which particularly permits a determination of the gradients of the route sections. This data, especially in combination with the current driving pattern (e.g. current speed, average speed, each in total as well as on the different types of roads, etc.) can be evaluated, as a result of which the future load state of the combustion machine over time and thus the associated exhaust gas heat supply can be predicted. This can be utilized as optimally as possible in that waste heat is fed, for example, only to the cyclic device, only to the heat storage tank or else to both components, for instance, if the combustion machine is currently being operated and will probably continue to be operated at high load or full load. Moreover, depending on the predicted waste heat supply, it can be the case that waste heat is not fed to the cyclic device or to the heat storage tank, for example, in order to temporarily avoid an increase in the exhaust gas counter-pressure that these can bring about due to their integration into the exhaust gas system.

Furthermore, it can preferably be provided that the predicting device comprises a tachograph. The tachograph can be employed to predict regular trips such as weekday trips to and from the workplace, since the trip profile (among other things, the route layout, the speed profile) is then known.

In this context, the device for predicting a future trip profile that will be driven can also comprise a link to a perpetual calendar or especially to a calendar that can be updated online, so as to take into account holidays and weekends during which a trip to work is not to be expected.

The tachograph can also store and evaluate person-related data. For this purpose, the tachograph can associate the logged trip profiles, for example, with the various vehicle ignition keys that can be individually configured and that are thus associated with regularly identified drivers.

The tachograph can especially also evaluate the past individual driving pattern of a given driver during the current trip and can evaluate this information in order to predict the future driving pattern during this trip (if applicable, only briefly interrupted).

In another preferred embodiment of the drive unit according to the invention, it can be provided that the cyclic device additionally comprises a compressor, which can be used as an alternative to the expansion device, and a throttle, so that this can also be used in a counter-clockwise thermodynamic cycle, whereby a (direct or indirect) heat transfer from the exhaust gas to the working medium or a (direct or indirect) heat transfer from the cooling medium to the working medium takes place.

With such an embodiment of the drive unit according to the invention, some of the thermal energy stored in the various components of the drive unit can still continue to be utilized, especially after the end of operation of the combustion machine, once the vehicle has come to a standstill.

Accordingly, it can especially be provided that the cyclic device can be operated in a clockwise cycle during the operation of the internal combustion engine, and in a counter-clockwise thermodynamic cycle during the standstill of the internal combustion engine, that is to say, at least temporarily by means of appropriate control.

The thermal energy stored in the components can be utilized after the end of the operation of the combustion machine, especially in order to continue heating the interior of the vehicle. Then, for example, it can be provided that, in the counter-clockwise cycle, there is a (direct or indirect) heat transfer from the exhaust gas system to the working medium, and from the working medium (directly or indirectly) to the air for climate-control inside the vehicle. In particular, the engine coolant circuit is involved in the heat transfer from the working medium to the air for purposes of interior climate-control.

As an alternative or in addition, the thermal energy that is stored in an engine coolant circuit can also be advantageously utilized by means of such an embodiment of the cyclic device. For this purpose, it could be provided that the second heat exchange device is integrated into the engine coolant circuit of the internal combustion engine.

The thermal energy stored in the engine coolant circuit can especially be utilized in that this thermal energy is used to charge a heat storage tank. Accordingly, it can be provided that a (direct or indirect) heat transfer from the working medium to the heat storage tank takes place in the counter-clockwise cycle.

A utilization of the thermal energy stored in the engine coolant circuit can also be provided to maintain a certain temperature level of the (exhaust) gas in the exhaust gas system, even when the combustion machine is not being operated. In this manner, it is possible to prevent an exhaust gas treatment device that is downstream from the first heat exchange device from cooling off, for example, in case of prolonged stop-and-go operation of the vehicle with a regularly alternating operation/non-operation of the combustion machine, for instance, by means of an automatic start-stop system.

In another preferred embodiment of the drive unit according to the invention, it can be provided that the compressor and the expansion device are configured integrally, that is to say, both functions can be performed by one machine. Here, it can be beneficial to reverse the flow direction of the working medium in the two cycles. Moreover, the same can also be beneficial for additional circuits, especially for the engine coolant circuit and the intermediate circuit according to the invention, which are connected to the cyclic device in a heat-exchanging manner via the first and second heat exchange devices so that the appertaining heat exchangers can always be operated in a counter-flow. As an alternative, however, it can also be provided for the compressor and the expansion device to be connected in parallel.

Since, if applicable, the pump can be used only in the clockwise cycle and, if applicable, the throttle can be used only in the counter-clockwise cycle, it can advantageously be provided that these two components are connected in parallel in the cyclic device. As a result, it can be prevented that these components have a negative effect on the other cycle.

BRIEF DESCRIPTION OF THE DRAWINGS

The invention is explained in greater detail below with reference to the embodiments presented in the drawings. The drawings show the following.

DETAILED DESCRIPTION OF THE INVENTION

Figure 1:
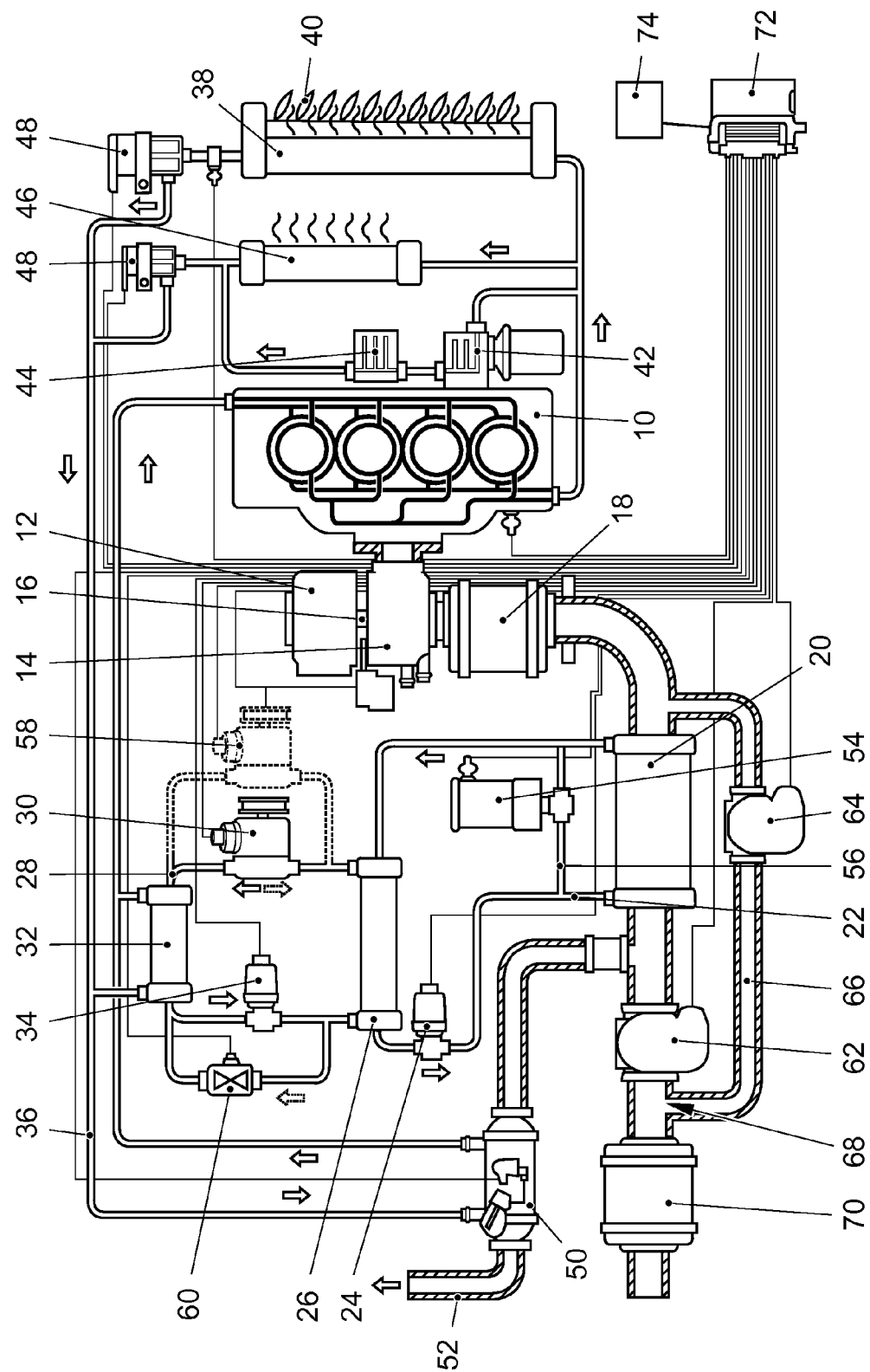
FIG. 1 a first embodiment of a drive unit according to the invention for a motor vehicle, in a schematic view.

The drive unit shown in FIG. 1 for a motor vehicle comprises a combustion machine in the form of an internal combustion engine 10 that is configured, for example, as a four-cylinder reciprocating diesel engine or Otto internal combustion engine. Thus, there are four cylinders in the internal combustion engine 10, whereby a movable piston is arranged in each of these cylinders. Together with the walls of the associated cylinder, each piston forms a combustion chamber in which compressed fresh gas (air) is combusted with directly injected fuel.

The fresh gas is fed to the internal combustion engine via a fresh gas system, most of which is not shown here. The fresh gas is compressed by means of the compressor 12 of an exhaust gas turbocharger.

The exhaust gas generated during the combustion of the fresh gas with the fuel is discharged from the internal combustion engine 10 via an exhaust gas system. In this process, the exhaust gas first flows through a turbine 14 of the exhaust gas turbocharger that is connected to the compressor 12 via a shaft 16, and subsequently through a first exhaust gas treatment device 18 such as, for example, a catalytic converter. Downstream from the first exhaust gas treatment device 18, a first heat exchanger 20 of a first heat exchange device of a cyclic device is integrated into the exhaust gas system.

The exhaust gas, on the one hand, and a liquid transfer medium of an intermediate circuit 22 of the cyclic device, on the other hand, flow through the first heat exchanger 20, whereby a heat transfer from the exhaust gas to the transfer medium can take place. A media pump 24 of the intermediate circuit 22 conveys the transfer medium. As a result, for one thing, the transfer medium that is warmed up by the exhaust gas enters a second heat exchanger 26—configured as an evaporator—of the first heat exchange device. The transfer medium, on the one hand, and a working medium of a working circuit 28 of the cyclic device, on the other hand, flow through the evaporator. Here, a heat transfer from the transfer medium to the working medium can take place. This heat transfer can bring about an evaporation and superheating of the working medium in the evaporator. In a clockwise cycle of the cyclic device, the superheated steam can then be expanded in an expansion device 30, a process in which mechanical power is generated that can be used to generate electrical energy and/or to directly mechanically power the vehicle or ancillary components of the combustion machine. In a second heat exchange device of the cyclic device, which, in the present embodiment, comprises only a heat exchanger 32 configured as a condenser, the working medium is then cooled off and changed back into the liquid phase (condensed). A media pump 34 of the working circuit then ensures that the liquid working medium is once again fed to the evaporator.

Not only the working medium but also the liquid coolant of an engine coolant circuit 36 flow through the condenser, a process in which a heat transfer from the working medium to the coolant takes place during the clockwise cycle. Consequently, the waste heat from the clockwise cycle can especially be discharged to the ambient air via a main cooler 38 of the drive unit. Here, the amount of ambient air flowing through the main cooler 38 can be automatically controlled by means of adjustable cooler vanes 40.

In addition to this, the waste heat from the clockwise cycle in the engine coolant circuit 36 can be used to more quickly bring the coolant to the operating temperature after a cold start of the combustion machine or, to the greatest extent possible, to maintain the operating temperature during operating phases of the internal combustion engine 10 at low loads. This can prevent a drop in the temperature of the internal combustion engine 10 as well as of additional components such as, for example, an engine cooler 42 (and thus the motor oil) and a transmission oil cooler 44 (and thus the transmission oil). Moreover, the waste heat from the clockwise cycle can be utilized to improve the heating effect of a heating system for the interior of the motor vehicle. For this purpose, a heat exchanger 46 of the heating system is integrated into the engine coolant circuit 36.

The flow of coolant through individual components of the engine coolant circuit 36 can be controlled as needed by appropriately actuating shut-off valves (not shown here) as well as two coolant pumps 48 that are integrated into the engine coolant circuit 36. In particular, cooling of the coolant in the main cooler 38 can be prevented during the warm-up phase after a cold start as well as during continuous operation of the internal combustion engine 10 at very low loads, as a result of which the operating temperature of the coolant can be reached as quickly as possible or maintained.

The coolant of the engine coolant circuit 36 also flows through a cooler 50 of a low-pressure exhaust gas return line 52. The low-pressure exhaust gas return line 52 branches off from the exhaust gas system downstream from the first heat exchanger 20 of the first heat exchange device. Shut-off valves can prevent the coolant from flowing through the cooler 50 of the low-pressure exhaust gas return line 52, whereby all of the coolant is then fed via the condenser (the heat exchanger 32) of the cyclic device.

The drive unit also comprises a heat storage tank 54 that is integrated into a bypass line 56 of the intermediate circuit 22 in order to allow the first heat exchanger 20 to be bypassed. The heat storage tank 54, which is configured as a latent heat storage tank, can absorb thermal energy from the transfer medium, can store it for a prolonged period of time, and can release it to the transfer medium once again as needed. In particular, it can be provided that the heat storage tank 54 absorbs thermal energy from the transfer medium when the internal combustion engine 10 is being operated at high loads. The thermal energy that can then be transferred in the first heat exchanger 20 from the exhaust gas to the transfer medium can then be greater than the thermal energy that can be transferred in the clockwise cycle. The excess thermal energy can be advantageously used to "charge" the heat storage tank 54.

In contrast, if the internal combustion engine 10 is operated during the warm-up phase or at low loads, the thermal energy that is transferred in the first heat exchanger 20 to the transfer medium can be less than the thermal energy that can be transferred in the clockwise cycle. In particular, this thermal energy can be so low that it is not sufficient to evaporate and superheat the working medium in the evaporator. Then, by appropriately actuating the heat storage tank 54, the thermal energy stored therein can first be transferred to the transfer medium and then—in the evaporator—to the working medium. This serves to assist the clockwise cycle or to even make it possible in the first place.

If the thermal energy transferred from the heat storage tank 54 and/or from the exhaust gas to the transfer medium is insufficient to ensure the evaporation of the working medium, then the working circuit 28 can also be used as a transfer circuit, so that, in this case, no clockwise cycle is carried out and accordingly, no mechanical power is generated by the expansion device 30, but thermal energy can continue to be transferred from the exhaust gas and/or from the heat storage tank 54 to the coolant of the engine coolant circuit 36. In order to prevent that there is a need for the working medium—which then serves as the transfer medium—to flow through the unused expansion device 30, a bypass line (not shown here) can be provided in order to bypass the expansion device 30.

The cyclic device is configured in such a way that it can also be operated in a counter-clockwise cycle and especially as a heat pump. For this purpose, either the expansion device 30 is configured in such a way that it can also function as a compressor, or else a separate compressor 58 is integrated into the working circuit 28 so as to be connected in parallel to the expansion device 30 (see broken-line depiction in FIG. 1). Moreover, the working circuit 28 comprises a throttle 60 that is connected in parallel to the media pump 34.

Whereas the cyclic device is operated in a clockwise cycle primarily during the operation of the internal combustion engine 10 in order to utilize the continuous heat flow of the exhaust gas, it is especially operated as a heat pump when the internal combustion engine 10 is no longer in operation. In this manner, the thermal energy that is still stored in various components of the drive unit can continue to be utilized.

In particular, it can be provided for the thermal energy stored in the heat storage tank 54 and/or in the exhaust gas system that is still warm to be utilized for purposes of continued operation of the interior heating system. Toward this end, the working medium in the working circuit 28 is evaporated in the evaporator—if applicable, to the level of negative pressure—by the transfer medium that is warmed up by the heat storage tank 54 and/or by the exhaust gas, then it is compressed in the compressor and condensed at a higher temperature level in the condenser while heat is transferred to the coolant, after which it is relieved to the lower process pressure by means of the throttle 60. Here, it is provided for the flow direction in the working circuit 28 to be identical to the flow direction during operation in a clockwise cycle (solid arrows in the working circuit).

Moreover, it can be provided that the thermal energy stored in the engine coolant circuit 28 and especially in the coolant is utilized to once again charge the heat storage tank 54 after the internal combustion engine 10 has been switched off. For this purpose, the working medium is evaporated in the working circuit 28 in the heat exchanger 32 of the second heat exchange device (in the clockwise cycle, this is the condenser) due to heat transfer from the "coolant", if applicable, to the level of negative pressure, after which the working medium is compressed in the expansion device 30 that functions as a compressor, or else in the compressor 58, and subsequently condensed to a higher temperature level in the second heat exchanger 26 of the first heat exchange device (in the clockwise cycle of the evaporator) while releasing heat to the transfer medium, after which it is relieved to the lower process pressure by means of the throttle 60. Then, heat is transferred from the warmed-up transfer medium to the heat storage tank 54 in order to charge the latter. Here, it is provided for the direction of flow in the working circuit 28 to be the opposite of that in the case of operation during the clockwise cycle (broken-line arrows in the working circuit). In order to permit the compressor 58 or the expansion device 30 that functions as a compressor to operate in both directions of flow, it can be provided for its suction and pressure sides to be reversed by means of a suitable valve circuit (not shown here). In order to ensure that the lower process pressure is reached, it can be provided for a vacuum pump (not shown here) to be integrated into the working circuit 28.

The exhaust gas system also comprises a first exhaust gas flap 62 that is integrated into a main line of the exhaust gas system downstream from the first heat exchanger 20 and from the branch of the low-pressure exhaust gas return line 52, and it also comprises a second exhaust gas flap 64 that is integrated into a bypass line 66 that bypasses the first heat exchanger 20, the branch of the low-pressure exhaust gas return line 52, and the first exhaust gas flap 62. By means of the exhaust gas flaps 62, 64, the exhaust gas flow can be made to bypass the first heat exchanger 20 and the low-pressure exhaust gas return line 52 via the bypass line 66 on an as-needed basis. This can especially be done when, after a cold start, a second exhaust gas treatment device 70 (for example, a diesel particulate filter), which is arranged downstream from the feed opening 68 of the bypass line 66, has to first be brought up to the operating temperature as quickly as possible, or when there is a need to avoid the exhaust gas counter-pressure—at times substantial—that the first heat exchanger 20 can bring about.

All of the actuatable components of the drive unit are actuated by an engine control device 72. These components are thus preferably configured so that they can be activated and operated electrically, but they can also be operated pneumatically or hydraulically, for which purpose actuators that can be actuated electrically and that function pneumatically or hydraulically can be provided.

The components can be actuated by the engine control device 72 as a function of signals of a navigation system 74 of the drive unit or of the motor vehicle. Consequently, among other things as a function of a predicted trip profile, it can be provided that the heat storage tank 54 is charged or discharged in order to achieve the best possible utilization of the thermal energy of the exhaust gas.

Figure 2:
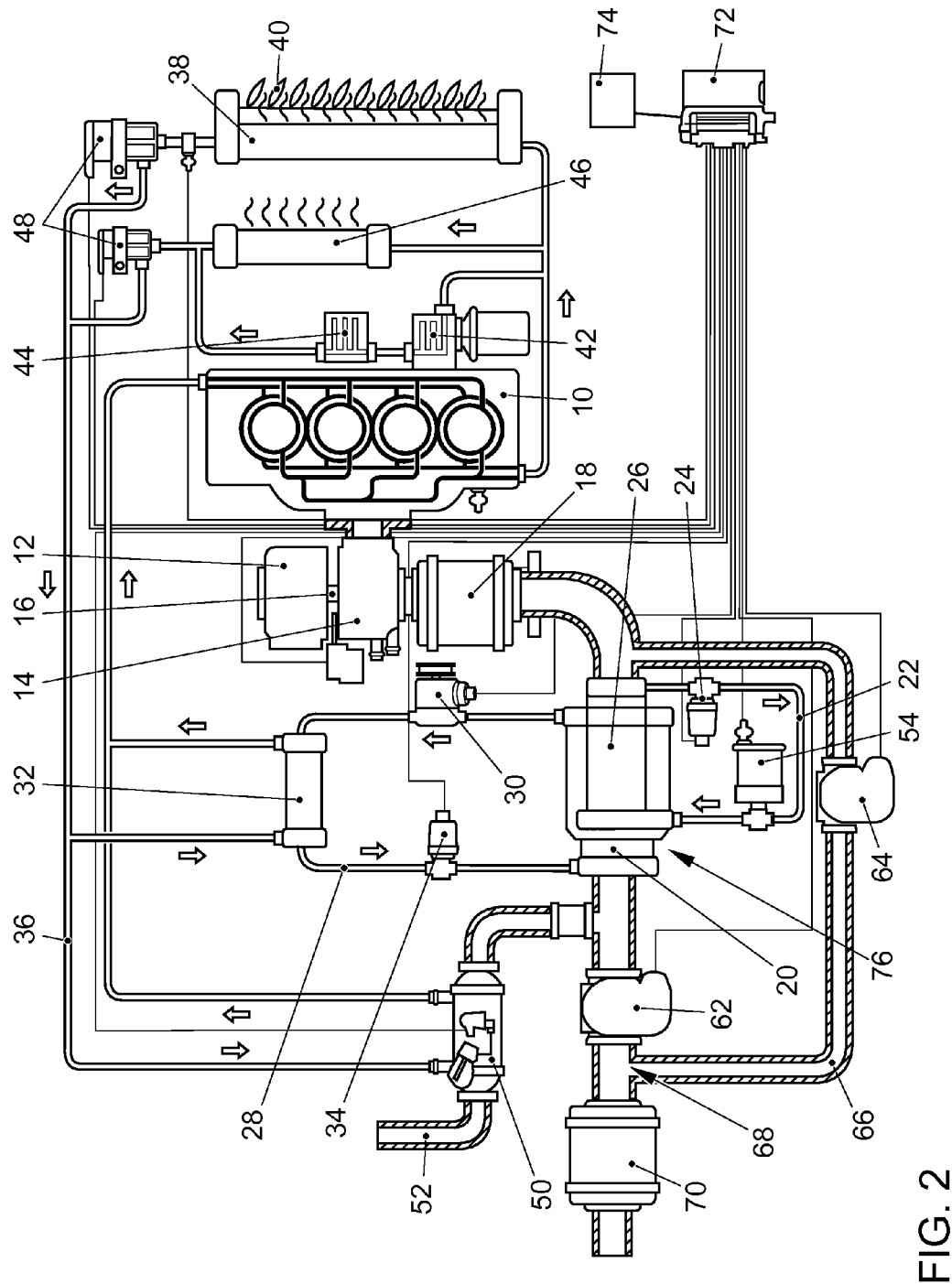
FIG. 2 a second embodiment of a drive unit according to the invention for a motor vehicle, in a schematic view.
Figure 3:
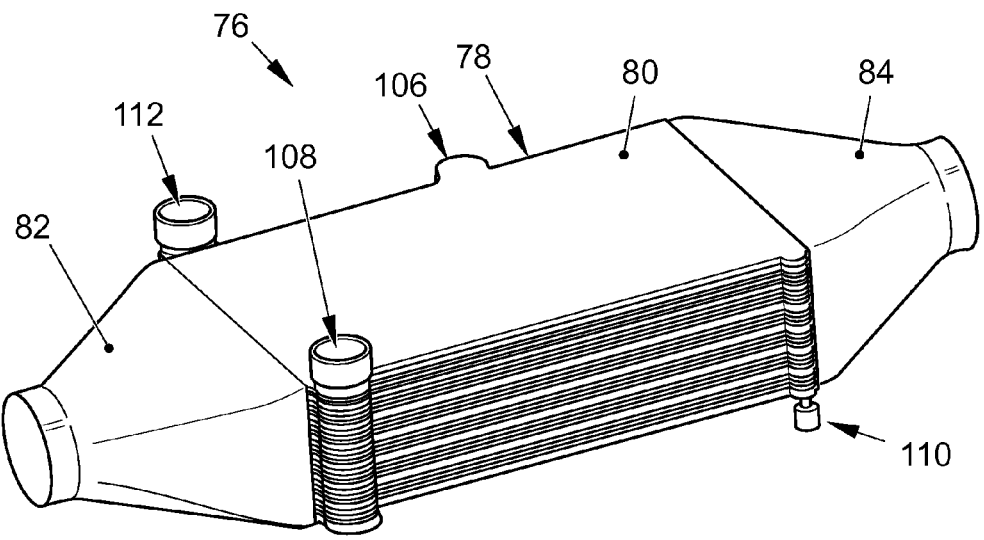
FIG. 3 a three-medium evaporator, in a perspective view.
Figure 4:
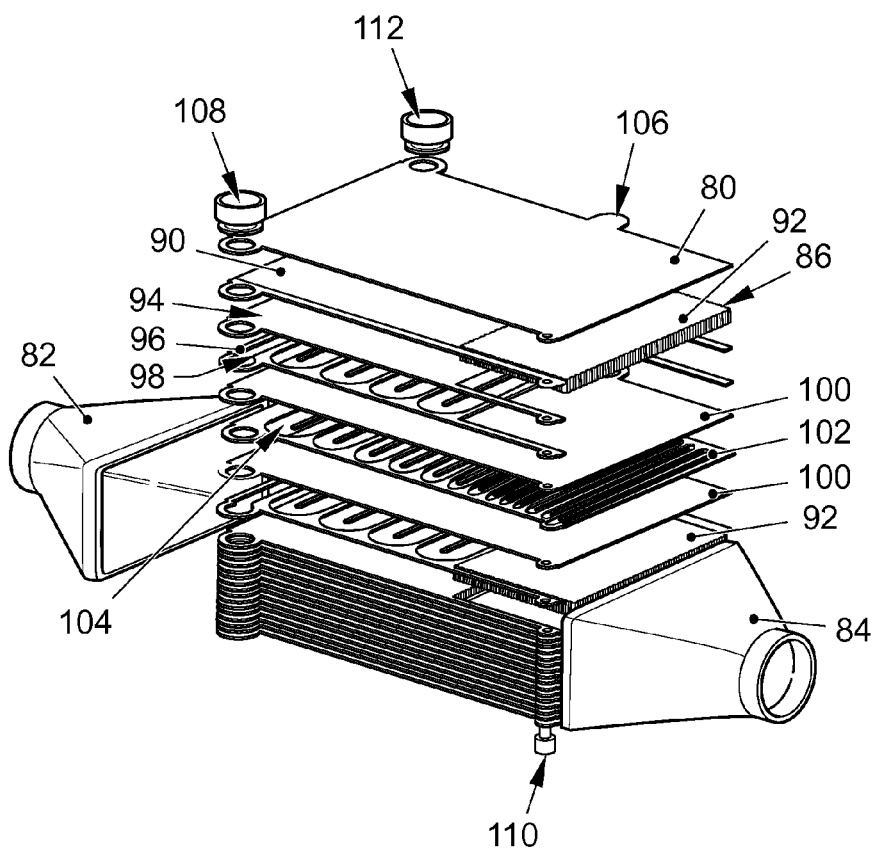
FIG. 4 the three-medium evaporator, in an exploded view.
Figure 5:
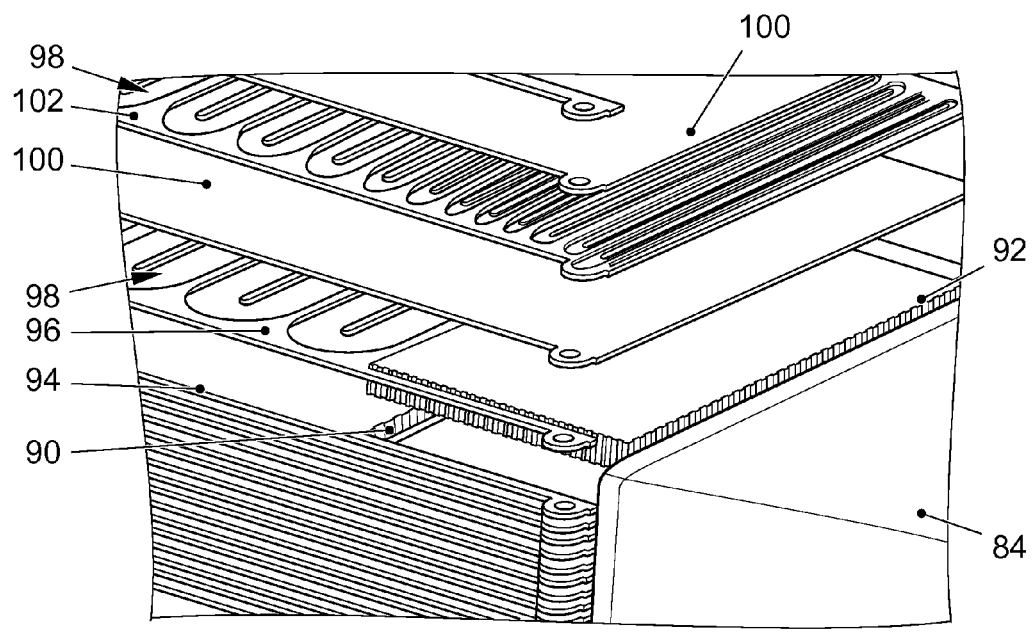
FIG. 5 an enlarged section of FIG. 4.

The embodiment of a drive unit shown in FIG. 2 differs from that of FIG. 1, for one thing, in that the cyclic device is not configured in such a way that it can also be used in a counter-clockwise cycle.

Furthermore, the first heat exchange device of the cyclic device is configured in such a way that it integrates the first heat exchanger 20 and the second heat exchanger 26 into a three-medium heat exchanger, which is concretely configured as a three-medium evaporator 76. The exhaust gas as the first medium, the working medium of the working circuit 28 as the second medium, and the transfer medium of the intermediate circuit 22 as the third medium all flow through the three-medium evaporator 76. Here, it is provided that, through an appropriate arrangement of the channels of the three-medium evaporator 76—which carry the individual media—the transfer medium is present at least in one section of a shared flow path of the exhaust gas and of the working medium between the exhaust gas and the working medium, so that this transfer medium or the intermediate circuit 22 can fulfill the function of a heat damper and heat buffer.

Figure 7:
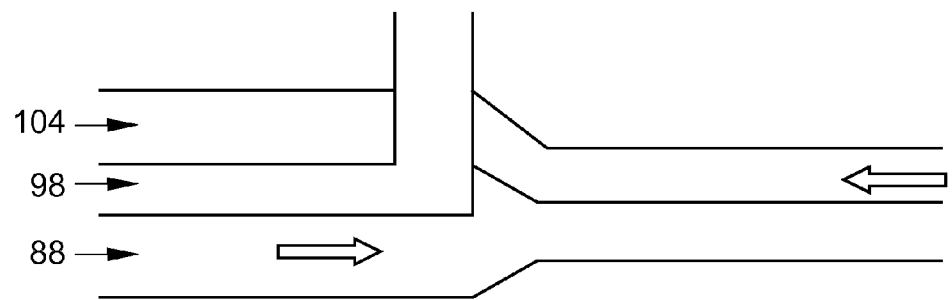
FIG. 7 a schematic diagram of the three-medium evaporator of FIGS. 3 to 6.
Figure 8:
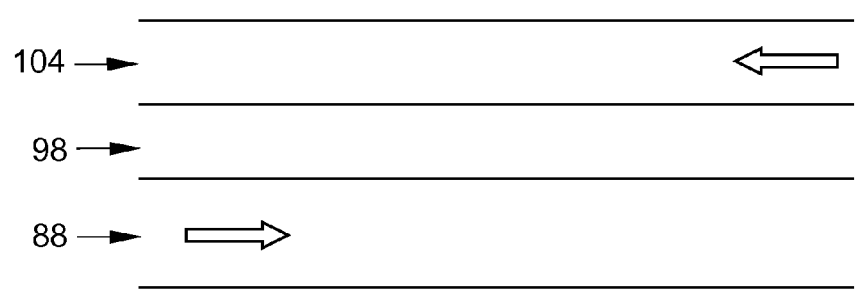
FIG. 8 a schematic diagram of an alternative three-medium evaporator.

Schematic diagrams of the mode of operation of the three-medium heat exchanger or of the three-medium evaporator 76 are shown in FIGS. 7 and 8.

Here, FIG. 8 shows a schematic diagram of a three-medium heat exchanger in which the transfer medium is present along the entire flow path between the exhaust gas and the working medium.

In FIG. 7, in contrast, the media channel that conveys the transfer medium extends only over a first section of the flow path, so that, in a second section, a direct heat transfer from the exhaust gas to the working medium is possible. Here, it is provided that the first section is arranged on the input side of the three-medium heat exchanger relative to the exhaust gas flow. As a result, the transfer medium functions as a heat damper in the first section in which the exhaust gas can still have such a high temperature that this would lead to a negative effect on the working medium, whereas in the second section, in which the exhaust gas has already been cooled off to a safe temperature, a direct heat transfer to the working medium is provided. Due to the resultant greater temperature differential between the two heat-exchanging media, the total heat transfer in the three-medium heat exchanger can be improved.

In both embodiments, it is provided that the flow directions of the exhaust gas and of the working medium are opposite to each other. The transfer medium can flow in both directions. In the drive unit according to FIG. 2, the flow direction of the transfer medium is the same as that of the working medium.

FIGS. 3 to 6 show an embodiment of a three-medium evaporator corresponding to the schematic diagram according to FIG. 7.

The three-medium evaporator 76 is configured as a multi-layered plate heat exchanger, whereby the individual plates form one or more media channels for the specific medium that is flowing through them. The plates, which are layered one above the other, form a block 78 of the three-medium evaporator 76 in which the heat exchange takes place. At the top and bottom, the block 78 is delimited by two cover plates 80. On the inlet and outlet sides, the block 78 is followed by an inlet funnel 82 and by an outlet funnel 84 for the exhaust gas via which the three-medium evaporator 76 can be integrated into a pipe network of an exhaust gas system of a drive unit according to the invention.

Figure 6:
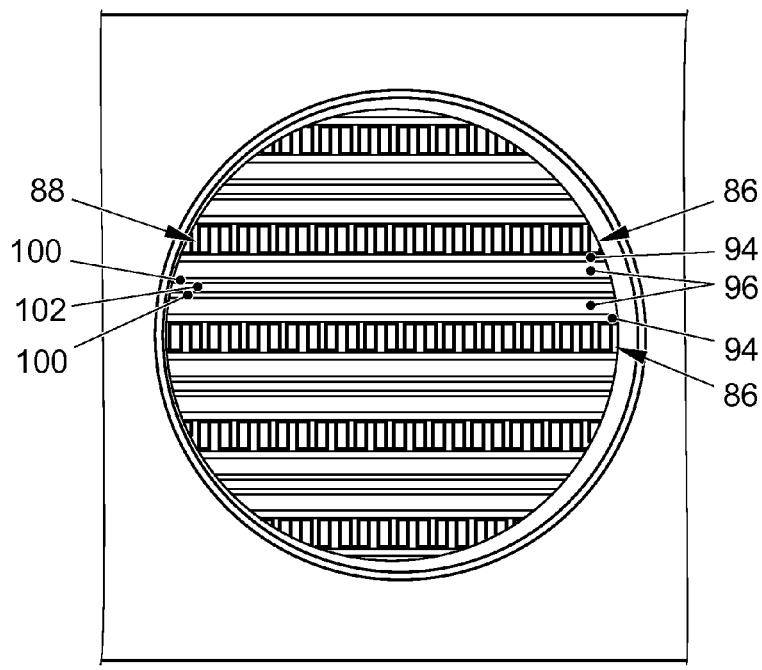
FIG. 6 the three-medium evaporator, in a front view.

The exhaust gas that enters through the inlet funnel 82 flows through the exhaust gas plates 86 that are provided to carry the exhaust gas through the block 78, said exhaust gas plates 86 forming a plurality of small media channels 88 for the exhaust gas, as can be seen especially clearly in FIG. 6. Due to the plurality of small media channels 88, the total size of the contact surface area between the exhaust gas and the exhaust gas plates 86 can be configured to be large, thereby ensuring sufficient heat transfer from the exhaust gas while taking into account the relatively poor heat transfer coefficient of the exhaust gas. The exhaust gas plates 86 form two sections that differ in terms of the their thickness. In a first section 90, which is adjacent to the inlet funnel 82, the plate thickness is less than in a second section 94, which is adjacent to the outlet funnel 84. As seen in the layering direction, each exhaust gas plate 86 is followed on both sides either by a cover plate 80 (on the outside of the two outermost exhaust gas plates 86) or else by a first intermediate plate 94. The first intermediate plates 94 are configured in such a way that they have cutouts in the section that is congruent with the second section 92 of the exhaust gas plates 86.

A transfer medium plate 96 is arranged on the side of each first intermediate plate 94 facing away from the exhaust gas plate 86. These transfer medium plates 96 each form a media channel 98 that is open on both sides in the layering direction and that extend in a sinuous or meandering manner between an inlet section and an outlet section. Here, the transfer medium plates 96 likewise have cutouts in the section that is congruent with the second section 92 of the exhaust gas plates 86.

On each side of each transfer medium plate 96 facing away from the first intermediate plate 94, there is a second intermediate plate 100 that covers the entire horizontal cross section of the block 78 and thus also the second section 92 of the exhaust gas plates 86.

The thickness of the second section 92 of each exhaust gas plate 86 is configured in such a way that said exhaust gas plate 86 extends through the cutouts of the adjacent first intermediate plate 94 and through the transfer medium plate 96 and contacts the second intermediate plate 100 in the appertaining section.

On each side of each second intermediate plate 100 facing away from the transfer medium plate 96, there is a working medium plate 102. These working medium plates 102 each form a media channel 104 that is open on both sides in the layering direction and that extend in a sinuous or meandering manner between an inlet section and an outlet section for the working medium. Here, the working medium plates 102 cover the entire horizontal cross section of the block 78 and the media channels 104 utilize the entire horizontal cross section of the block 78 as completely as possible.

The above-mentioned layering is a layered structure that, with its alternating layering directions, forms the block 78 with its multiple layers. Each working medium plate 102 is thus surrounded on both sides by a second intermediate plate 100, each followed by a transfer medium plate 96, then by a first intermediate plate 94, then by an exhaust gas plate 86, and then either once again by a second intermediate plate 100 or else by a cover plate 80.

Owing to the cutouts in the first intermediate plates 94 and in the transfer medium plates 96 for the second section 92 of the exhaust gas plates 86, the heat transfer between the exhaust gas and the working medium in the second section of the three-medium evaporator is direct (except for where second intermediate plates 100 have been inserted, which is necessary for the physical separation of the exhaust gas and the working medium), as is schematically shown in FIG. 7.

The media channels 104 formed by the working medium plates 102 widen continuously, starting from the inlet sections all the way to the outlet sections. As a result, the increase in the volume of the working medium during the change from the liquid to the gaseous phase is taken into account.

Inlets and outlets for the transfer medium and for the working medium are formed by overlapping passage openings that extend in the layering direction in all of the plates (only partially in the cover plates) which, in the case of the inlet 106 and the outlet 108 for the transfer medium, are connected to the associated media channel 98 in each of the transfer medium plates 96 and, in the case of the inlet 110 and the outlet 112 for the working medium, are connected to the associated media channel 104 in each of the working medium plates 102.

LIST OF REFERENCE NUMERALS 10 internal combustion engine
12 compressor of the exhaust gas turbocharger
14 turbine of the exhaust gas turbocharger
16 shaft of the exhaust gas turbocharger
18 first exhaust gas treatment device
20 first heat exchanger of the first heat exchange device
22 intermediate circuit
24 media pump of the intermediate circuit 26 second heat exchanger of the first heat exchange device
28 working circuit
30 expansion device
32 heat exchanger of the second heat exchange device
34 media pump of the working circuit
36 engine coolant circuit
38 main cooler
40 vanes
42 engine oil cooler
44 transmission oil cooler
46 heat exchanger of the heating system
48 coolant pump
50 cooler of the low-pressure exhaust gas return line
52 low-pressure exhaust gas return line
54 heat storage tank
56 bypass lines of the intermediate circuit
58 compressor of the working circuit
60 throttle
62 first exhaust gas flap
64 second exhaust gas flap
66 bypass line of the exhaust gas system
68 feed opening
70 second exhaust gas treatment device
72 engine control device
74 navigation system
76 three-medium evaporator
78 block
80 cover plate
82 inlet funnel
84 outlet funnel
86 exhaust gas plate
88 media channel in an exhaust gas plate
90 first section of an exhaust gas plate
92 second section of an exhaust gas plate
94 first intermediate plate
96 transfer medium plate
98 media channel in a transfer medium plate
100 second intermediate plate
102 working medium plate
104 media channel in a working medium plate
106 inlet for the transfer medium
108 outlet for the transfer medium
110 inlet for the working medium
112 outlet for the working medium

The invention claimed is:

1. A drive unit for a motor vehicle, comprising:
an internal combustion engine of a motor vehicle;
an exhaust gas system via which exhaust gas can be discharged from the internal combustion engine; and
a cyclic device configured to convert the thermal energy contained in the exhaust gas into mechanical work in a clockwise thermodynamic cycle, wherein the cyclic device comprises a first heat exchange device comprising a working medium, an expansion device comprising a working medium, and a second heat exchange device comprising a cooling medium, whereby the cycle comprises
a heat transfer from the exhaust gas to the working medium in the first heat exchange device, as a result of which the temperature or the pressure of the working medium, or both, is increased,
comprises an expansion of the working medium in the expansion device for generating the mechanical work, and
comprises a heat transfer from the working medium to the cooling medium in the second heat exchange device,
wherein the first heat exchange device comprises a first heat exchanger and a second heat exchanger as well as an intermediate circuit containing a transfer medium,
whereby in the first heat exchanger, thermal energy is transferred from the exhaust gas to the transfer medium, and in the second heat exchanger, thermal energy is transferred from the transfer medium to the working medium;
the drive unit further comprising a heat storage tank integrated into the cyclic device.

2. The drive unit according to claim 1,
wherein the clockwise cycle is a steam cycle,
whereby the pressure of the working medium in the liquid state is increased by means of a pump, the working medium evaporates in the first heat exchange device and then condenses in the second heat exchange device.

3. The drive unit according to claim 1, wherein the heat storage tank is integrated into the intermediate circuit.

4. The drive unit according to claim 1, wherein the heat transfer from the heat storage tank to the working medium takes place in or upstream from the first heat exchange device.

5. The drive unit according to claim 1, wherein the heat is transferred from the working medium to the coolant of a coolant circuit of the internal combustion engine.

6. The drive unit according to claim 1, wherein the first heat exchanger and the second heat exchanger are spatially separated from each other, and they are connected to each other via the intermediate circuit.

7. The drive unit according to claim 1,
wherein the first heat exchange device comprises a three-medium heat exchanger that integrally forms the first heat exchanger and the second heat exchanger,
whereby the three-medium heat exchanger forms a first media channel for the exhaust gas, a second media channel for the working medium, and, in at least one section, a third media channel for the transfer medium and that is arranged between the first media channel and the second media channel so that the heat transfer from the exhaust gas to the working medium takes place via the transfer medium.

8. The drive unit according to claim 7, wherein at least one of the second media channel and the third media channel is formed in a plate, whereby the exhaust gas flows around the plate that forms the third media channel.

9. The drive unit according to claim 7, wherein the second media channel widens in its intended flow direction.

10. The drive unit according to claim 7, wherein the three-medium heat exchanger is a multi-layered plate heat exchanger.

11. The drive unit according to claim 7, wherein a plate that forms the third media channel is smaller than a plate that forms the second media channel so that the exhaust gas flows around the plate that forms the second media channel.

12. The drive unit according to claim 7, wherein the third media channel is arranged in only a first section of the three-medium heat exchanger, the first section located between the first media channel and second media channel such that in a second section of the three-medium heat exchanger, heat transfer from the exhaust gas to the working medium takes place directly.

* * * * *